(No Model.)

J. M. THORP.
ADJUSTABLE AXLE NUT.

No. 431,788. Patented July 8, 1890.

WITNESSES:
F. McArdle
C. Sedgwick

INVENTOR:
J. M. Thorp
BY
Munn & Co.
ATTORNEYS

UNITED STATES PATENT OFFICE.

JAMES MADISON THORP, OF SANTA ROSA, CALIFORNIA.

ADJUSTABLE AXLE-NUT.

SPECIFICATION forming part of Letters Patent No. 431,788, dated July 8, 1890.

Application filed January 7, 1890. Serial No. 336,148. (No model.)

*To all whom it may concern:*

Be it known that I, JAMES MADISON THORP, of Santa Rosa, in the county of Sonoma and State of California, have invented a new and Improved Adjustable Axle-Nut, of which the following is a full, clear, and exact description.

My invention relates to improvements in adjustable nuts for holding vehicle-wheels upon the axle; and the object of my invention is to provide a nut that may be quickly and easily adjusted to take up the wear of vehicle-hubs and axle-shoulders, and in which the washers usually used in connection with axle-nuts may be dispensed with.

To this end my invention consists in a longitudinally-separable nut having an internal screw-thread to fit the axle-thread, the two parts having correspondingly-beveled seats adapted to fit each other and a set-screw connection through a slot in one of the parts whereby they may be held in a desired position. This construction will be hereinafter fully described, and specifically pointed out in the claims.

Reference is to be had to the accompanying drawings, forming a part of this specification, in which similar letters and figures of reference indicate corresponding parts in all the views.

Figure 1:
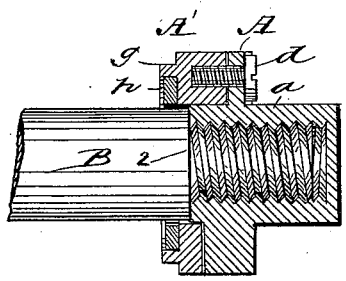
Figure 2:
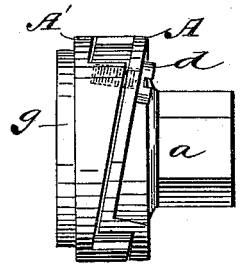
Figure 3:
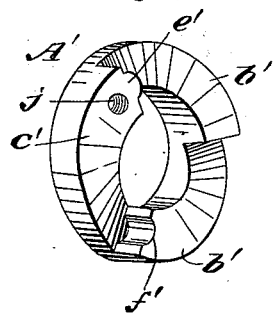
Figure 4:
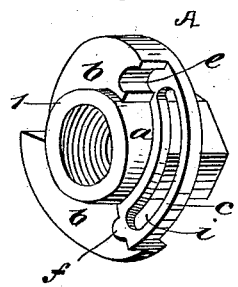

Figure 1 is a view of the nut embodying my invention as applied to a vehicle-axle, the nut being shown in longitudinal section; Fig. 2, a side elevation of the nut, the threaded portion of the set-screw therein being indicated by dotted lines; Fig. 3, a perspective view of the inner part of the nut, and Fig. 4 a perspective view of the main or outer portion of the nut.

The nut, which consists of two parts A and A′, is attached to the axle B in the usual manner, the part A being provided with a hollow internally-screw-threaded socket $a$, which fits the thread of the axle B, and which projects from each side of the part A, the sides of the outer end being flattened to fit a wrench and the inner end terminating in a smooth peripheral face 1, which fits against the shoulder 2 of the axle B. The part A is also provided upon its inner side with three beveled seats $b\ b$ and $c$, which are spaced regularly around the part A, and which have the same pitch, the seat $c$ having a curved slot $i$ extending throughout its entire length to receive the set-screw $d$, as will appear hereinafter. The part A is also beveled upon its outer face opposite the seat $c$, so that the wall of the part A between its outer face and the face of the seat $c$ will be of even thickness to facilitate the adjustment of the parts by the set-screw $d$.

One of the seats $b$ is provided at its thickest end with a semi-cylindrical recess $e$ to receive a corresponding lug on the part A′ of the nut, and the thick end of the seat $c$ is provided with a semi-cylindrical projection $f$, which fits a corresponding recess in the part A′ of the nut. The inner portion A′ of the nut is provided with a central opening which fits over the inner end of the spindle $a$ of the part A, and with beveled seats $b'\ b'$ and $c'$, which are of the same size and pitch as the seats $b\ b$ and $c$ of the part A, so that the seats of the two parts will fit closely together.

The opening in the part A′ is a little larger than the end of the axle B, so that said part will slightly overlap the axle. The part A′ is also provided on the side next the wheel with an annular flange $g$, adapted to hold a leather washer $h$, which will bear against the wheel-hub; but the side next the wheel may be made entirely smooth and the washer dispensed with.

One of the seats $b'$ is provided with a projection $e'$, which fits the corresponding recess $e$ of a seat $b$ on the part A, and the end of the seat $c'$ is provided with a recess $f'$, which receives a corresponding projection $f$ of the seat $c$ on the part A. The face of the seat $c'$ is provided with a screw-hole $j$, which fits the thread of the set-screw $d$, and which will be opposite the curved slot $i$ in the seat $c$ when the two parts of the nuts are attached.

To attach the parts A and A′ together, the part A′ is placed upon the socket $a$ of the part A, so that the seats $b\ b$ and $c$ and the seats $b'\ b'$ and $c'$ will come together, the thick part of one seat fitting the thin part of the seat opposite, the lug $e'$ projecting into the recess $e$ and the lug $f$ projecting into the recess $f'$. The parts will thus be in their most compact form, and they are held in a united position by the set-screw $d$, which passes through the slot $i$ of the seat $c$ and into the screw-hole $j$ of the seat $c'$ and is screwed tightly in place. The parts will thus be practically a single solid nut. In this shape it would usually be applied to a new carriage. As the parts of the vehicle-hubs become worn, it will be necessary to thicken the nut to counteract the wear. This is done by simply loosening the set-screw $d$ and turning the parts A and A', or either of them, so that the thicker parts of the seats will be in contact, and as the seats are of the same pitch it will be seen that the thickness of the nut may thus be very nicely regulated. When the parts are adjusted, the set-screw $d$ is again tightened to hold them in place. When the set-screw $d$ is to be loosened, it will be necessary to turn it but little, as the outer side of the part A opposite the seat $c$ is cut away, so that the wall of the seat upon which the head of the screw $d$ bears will be of even thickness, and a slight turn of the screw will tighten or loosen it when the seats are in any possible position. From the foregoing description it will be seen that the thickness of the nut can be easily changed to any desired extent within the limits of the thickness of the beveled seats.

In the drawings I have shown the parts A and A' having each three beveled seats, and I find that a convenient number; but it is obvious that a larger or a smaller number may be used without changing the nature of the invention.

The nuts should be made rights and lefts—that is, one nut should have the seats beveled in one direction—and another in the opposite direction, so that when applied to an axle, if the axle should heat, the inner part of the nut would be turned off, and if the set-screw $d$ should become loose the nut would close up—that is, the two parts would be forced together.

Having thus described my invention, I claim as new and desire to secure by Letters Patent—

1. A longitudinally-separable axle-nut provided with an internal screw-thread to fit an axle, having the abutting faces of its parts provided with correspondingly-beveled seats, and having a suitable set-screw for holding its parts together, substantially as described, and for the purpose set forth.

2. An adjustable axle-nut consisting, essentially of two longitudinally-separable parts having their abutting faces correspondingly beveled, and having a suitable set-screw for holding the parts together, the outer of said parts being provided with an internally-screw-threaded socket to fit the thread of the axle, and the inner of said parts being adapted to be placed upon said spindle and overlap the bearing-face of the axle, so as to press against the wheel-hub, substantially as described.

3. An adjustable axle-nut consisting, essentially, of the part A, having the internally-screw-threaded socket $a$ and the beveled seats $b\ b$ and $c$, the seat $c$ being slotted to receive the screw $d$, as shown, the part A' having beveled seats $b'\ b'$ and $c'$ to fit the seats of the part A, and having a central opening to receive the socket $a$ of the part A, and the set-screw $d$, adapted to enter the slot $i$ of seat $c$ and a hole $j$ of seat $c'$, and hold the parts together, substantially as described.

4. In an adjustable axle-nut, the combination, with the part A, having internally-screw-threaded socket $a$ to fit the axle, and the beveled seats $b\ b$ and $c$, said seats being provided at the ends with recess $e$ and projection $f$, and the seat $c$ being slotted, as shown, of the part A', having a central opening to fit upon the socket $a$, beveled seats $b'\ b'$ and $c'$ to fit the beveled seats of the part A, said seats being provided with projections $e'$ and recess $f'$ to fit the corresponding projection and recess of the seats $b\ b$ and $c$, and the set-screw $d$, adapted to enter the slot $i$ and hole $j$ and hold the parts together, substantially as described.

5. In an adjustable axle-nut, the combination of the parts A and A', having means, as seats $b\ b$ and $c$ and $b'\ b'$ and $c'$, to regulate the thickness of the nut, and means, as set-screw $d$, for attaching the parts together, said part A having its outer face opposite the face of the seat $c$, beveled to correspond with the face of said seat, substantially as described, and for the purpose specified.

JAMES MADISON THORP.

Witnesses:
  E. F. WOODWARD,
  W. D. REYNOLDS.